(12) United States Patent
Brown

(10) Patent No.: US 7,263,448 B2
(45) Date of Patent: Aug. 28, 2007

(54) CONTINUOUS FLOW CHEMICAL METERING APPARATUS

(76) Inventor: Trevor Brown, Box 68206 RPO Bonnie Doon, Edmonton, Alberta (CA) T6C 4N6

( * ) Notice: Subject to any disclaimer, the term of this patent is extended or adjusted under 35 U.S.C. 154(b) by 39 days.

(21) Appl. No.: 11/339,157

(22) Filed: Jan. 25, 2006

(65) Prior Publication Data

US 2006/0204404 A1    Sep. 14, 2006

(30) Foreign Application Priority Data

Mar. 11, 2005   (CA) ................... 2501530

(51) Int. Cl.
*G01F 17/00* (2006.01)
(52) U.S. Cl. ....................................... 702/50
(58) Field of Classification Search ............. 702/50
See application file for complete search history.

(56) References Cited

U.S. PATENT DOCUMENTS 4,538,445 A    9/1985  Kenik 4,897,797 A    1/1990  Free, Jr. et al.
4,987,914 A *  1/1991  Adney et al. ................ 137/8
5,040,126 A *  8/1991  Allington .................. 702/47

* cited by examiner

*Primary Examiner*—Hal Wachsman
*Assistant Examiner*—Demetrius R. Pretlow
(74) *Attorney, Agent, or Firm*—Davis Bujold & Daniels, P.L.L.C.

(57) ABSTRACT

A continuous flow chemical metering apparatus includes a measuring vessel adapted to hold a column of fluid, a sensor for determining head pressure and a processor to establish calibration data regarding the relationship between head pressure and a height of the column of fluid in the measuring vessel. A valve is closed when the height of the column of fluid in the measuring vessel reaches a predetermined level, so that chemical drawn by the chemical injection device partially empties the measuring vessel. The processor determines flow rate by monitoring signals from the at least one sensor and performing calculations using the calibration data and current data regarding dynamic changes to head pressure.

10 Claims, 2 Drawing Sheets

US 7,263,448 B2

CONTINUOUS FLOW CHEMICAL METERING APPARATUS

This application claims priority from Canadian Application Serial No. 2,501,530 filed Mar. 11, 2005.

FIELD OF THE INVENTION

The present invention relates to a chemical metering apparatus, which provides continuous monitoring, and a system having incorporated into it such chemical metering apparatus.

BACKGROUND OF THE INVENTION

U.S. Pat. No. 4,538,445 (Kenik 1985) entitled "Liquid Flow Meter" discloses a chemical meter system that permits intermittent testing by selectively opening and closing of system valves.

SUMMARY OF THE INVENTION

According to the present invention there is provided a continuous flow chemical metering apparatus, which includes a conduit adapted to be connected as part of a chemical injection line downstream of a chemical storage tank and upstream of a chemical injection device for controlling injection of chemical drawn from the chemical storage tank through the chemical injection line. A measuring vessel is provided which is adapted to hold a column of fluid. The measuring vessel is in fluid communication with the conduit. An automated valve is provided for controlling flow through the conduit. The automated valve is positioned upstream of the measuring vessel. At least one sensor is provided for determining head pressure of the measuring vessel. A processor is provided which is capable of being calibrated to establish calibration data regarding the relationship between head pressure and a height of the column of fluid in the measuring vessel. The processor is adapted to control the automated valve and to receive data from the at least one sensor. The processor controls a continuous testing cycle in which the automated valve is closed when the height of the column of fluid in the measuring vessel reaches a predetermined level, so that chemical drawn by the chemical injection device partially empties the measuring vessel, and then the automated valve is reopened so that chemical drawn by the chemical injection device is drawn from the chemical storage tank while the height of the column of fluid in the measuring vessel again has an opportunity to rise. The processor determines flow rate by monitoring signals from the at least one sensor and performing calculations using the calibration data and current data regarding dynamic changes to head pressure.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
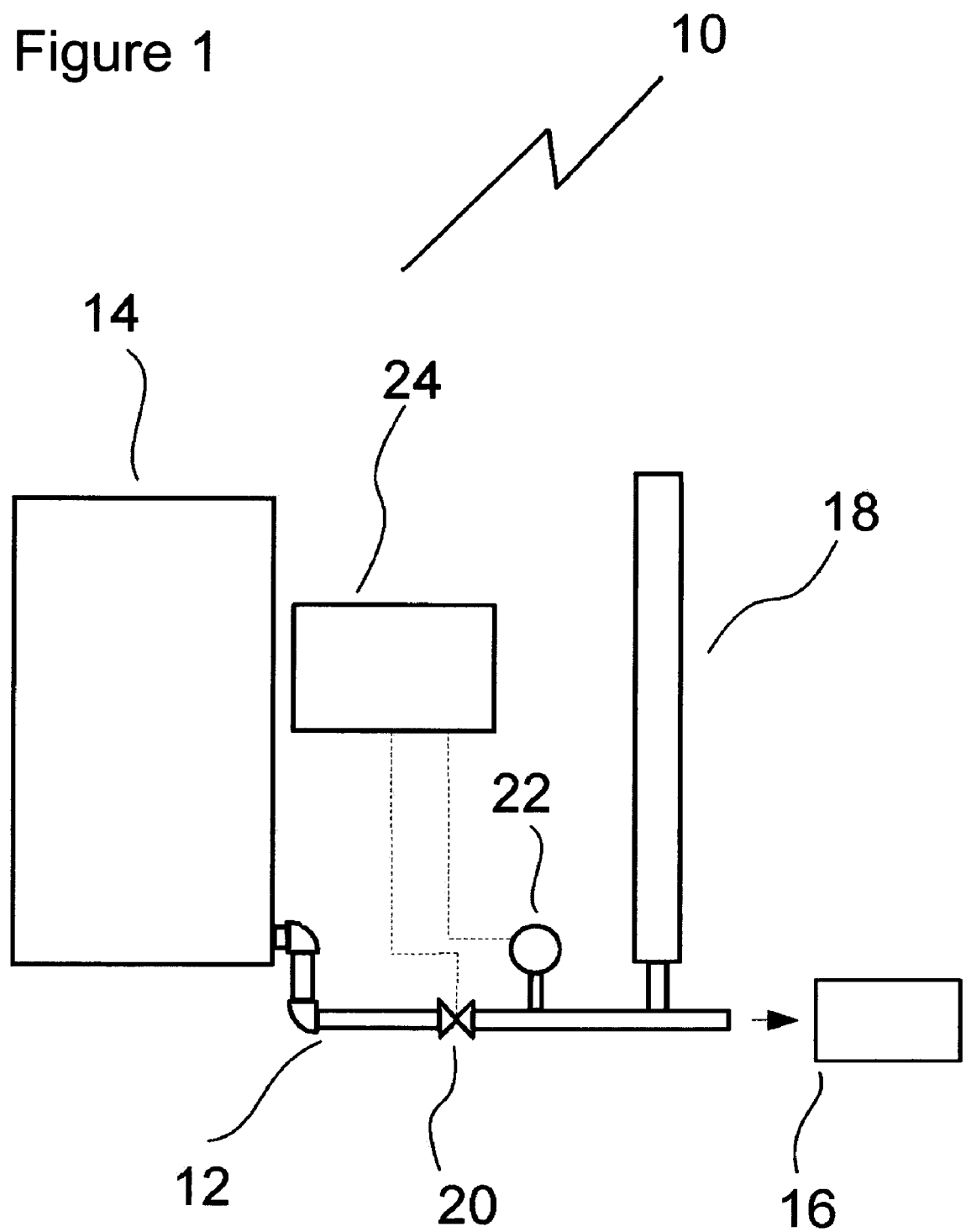
FIG. 1 is a schematic diagram of a first embodiment of continuous flow chemical metering system constructed in accordance with the teachings of the present invention.

Various industries such as oil & gas, water treatment plant, power generation, manufacturing etc., require that chemicals be added into the process at a very precise rate. These rates can be very low (i.e. <1 ml per minute). In order to feed or inject this chemical into the process at various pressures a positive displacement pump is typically required. These pumps can be of a reciprocating or a solenoid design, typically operating from 1 to about 200 pulses per minute. Due to the pulsations or instantaneous flows that this pump may create the line sizes are typically oversized to reduce friction that could cause damage to equipment, due to pressure spikes, and also provide for more repeatable injection of chemicals, since the output of pump could vary with different injection pressures or back pressures at discharge of pump.

Due to these factors (oversized lines, pulsations, wide range of flow or pressure etc.) it has been very difficult if not impossible for a device to quickly, accurately and repeatably measure flow.

Although devices similar to the one being proposed have been patented (i.e. measuring the change in fluid height and calculating for volume between two points over a period of time), they would not be capable of measuring with the same degree of accuracy since they do not correct for external disturbances such as changes in; atmospheric/ambient pressure, temperature, density, gravitational forces nor do they respond as quickly and therefore not suitable for similar applications.

The preferred embodiments will now be described with reference to FIGS. 1 and 2. A first embodiment, generally identified by reference numeral 10, will be described with reference to FIG. 1. A second embodiment, generally identified by reference numeral 100, will be described with reference to FIG. 2.

Structure and Relationship of Parts:

Referring to FIG. 1, there is illustrated a continuous flow chemical metering apparatus 10 having a conduit 12 adapted to be connected as part of a chemical injection line downstream of a chemical storage tank 14 and upstream of a chemical injection device 16 for controlling injection of chemical drawn from the chemical storage tank 14 through the chemical injection line. The chemical injection device 16 can be a valve, pump or another device operated continuously or intermittently. A measuring vessel 18 adapted to hold a column of fluid is connected to the conduit 12, the measuring vessel 18 being in fluid communication with the conduit 12. An automated valve 20 for controlling flow through the conduit 12 is located upstream of the measuring vessel 18. A means for determining head pressure of the measuring vessel 18, including at least one sensor 22 is provided. A processor 24 is provided which is capable of being calibrated to establish calibration data regarding the relationship between head pressure and a height of the column of fluid in the measuring vessel 18. The processor is adapted to control the automated valve 20 and to receive data from the at least one sensor 22.

Figure 2:
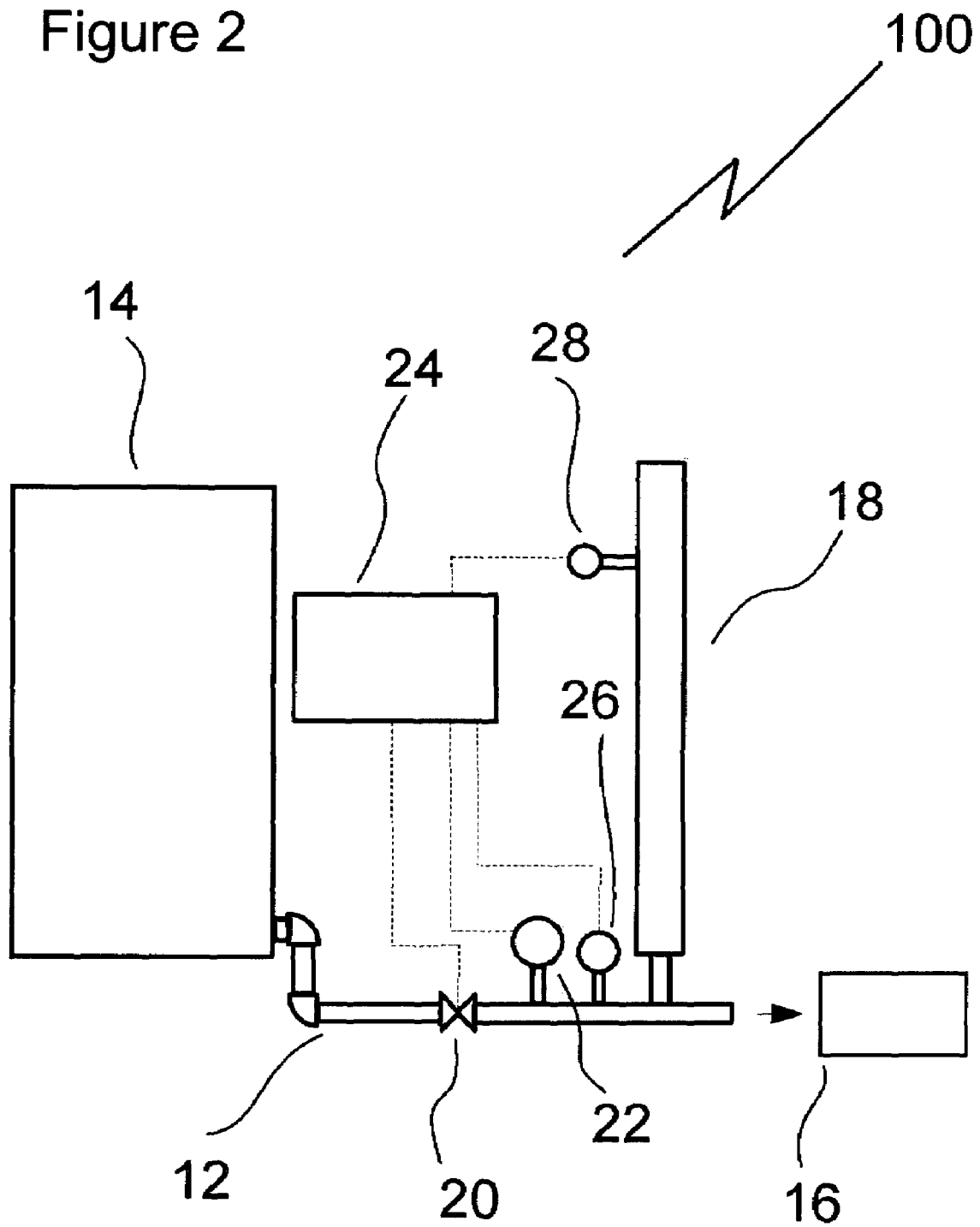
FIG. 2 is a schematic diagram of a second embodiment of continuous flow chemical metering system, with additional features, constructed in accordance with the teachings of the present invention.

Referring to FIG. 2 there is illustrated a continuous flow chemical metering apparatus 100 having a conduit 12 adapted to be connected as part of a chemical injection line downstream of a chemical storage tank 14 and upstream of a chemical injection device 16 for controlling injection of chemical drawn from the chemical storage tank 14 through the chemical injection line. The chemical injection device 16 can be a valve, pump or another device operated continuously or intermittently. A measuring vessel 18 adapted to hold a column of fluid is connected to the conduit 12, the measuring vessel 18 being in fluid communication with the conduit 12. An automated valve 20 for controlling flow through the conduit 12 is located upstream of the measuring vessel 18. A means for determining head pressure of the measuring vessel 18, including at least one sensor 22 is provided. A processor 24 is provided which is capable of being calibrated to establish calibration data regarding the relationship between head pressure and a height of the column of fluid in the measuring vessel 18. The processor is adapted to control the automated valve 20 and to receive data from the at least one sensor 22. A temperature sensor 26 is provided on one of the measuring vessel 18 or the chemical injection line 22. A level sensor 28 is provided on the measuring vessel 18.

Operation:

In the preferred embodiments, 10 in FIG. 1 and 100 in FIG. 2, first, a calibration is manually or automatically completed consisting of opening the automated valve 20 and allowing fluid to fill the measuring vessel 18 to two or more known or entered heights. At least one sensor 22, such as a differential pressure transmitter or two individual pressure sensors one of which is measuring atmospheric pressure changes and subtracting that amount from the first sensor that is measuring the liquid pressure thereby providing a net pressure reading unaffected by atmospheric or ambient pressure change, continuously monitors the head pressure of the measuring vessel 18. The difference of the pressure signals is fed into the processor 24 and the corresponding pressure readings relating to height are then entered to memory.

Referring to the first embodiment 10 in FIG. 1, the processor controls a continuous testing cycle in which the automated valve 20 is closed when the height of the column of fluid in the measuring vessel 18 has stabilized so that chemical drawn by the chemical injection device 16 partially empties the measuring vessel 18. It must be noted, that if the instrument is not intended to determine the fluid level in the chemical storage tank, that an arbitrary predetermined level may be selected, instead of a stabilized level. The stabilizing of the height of the column of fluid is necessary however, in order to establish a relationship between the height of the column of fluid in the measuring vessel and the fluid level in the chemical storage tank. After the measuring vessel 18 has been partially emptied, the automated valve 20 is reopened so that chemical drawn by the chemical injection 16 device is drawn from the chemical storage tank 14 while the height of the column of fluid in the measuring vessel 18 again has an opportunity to rise. The processor 24 determines the flow rate by monitoring signals from at least one sensor 22, which is continuously recorded to memory, and performing calculations using the calibration data and current data regarding dynamic changes to head pressure.

Referring to the second embodiment 100 in FIG. 2, the processor controls a continuous testing cycle in which the automated valve 20 is closed when the height of the column of fluid in the measuring vessel 18 has stabilized so that chemical drawn by the chemical injection device 16 partially empties the measuring vessel 18. Then the automated valve 20 is reopened so that chemical drawn by the chemical injection device 16 is drawn from the chemical storage tank 14 while the height of the column of fluid in the measuring vessel 18 again has an opportunity to stabilize. The processor 24 determines the flow rate by monitoring signals from sensors, including at least one sensor 22, temperature sensor 26, and level sensor 28 for automated specific gravity calibration, and performing calculations using the calibration data and current data regarding dynamic changes to head pressure. The temperature sensor 26 and level sensor 28 could be used to automatically determine the physical height of the fluid and then use this level information along with the measured/calculated level from the pressure sensors to determine the fluid density.

In either embodiment, 10 in FIG. 1, or 100 in FIG. 2, in addition to flow rate, the following information, but not limited to, can also be determined and displayed digitally or output via analog or digital signal: storage tank 14 level, loss of fluid, other than fluid passing through the chemical injection device 16 such as leaks between storage tank 14 and automated valve 20. Also, by using measuring vessels 18 with various volumes, heights, sizes, or shapes such as staged and tapered etc., or by using combinations of measuring vessels 18, flow rates from a drip per minute to hundreds of liters per minute can be accurately and very quickly calculated and a change in flow indicated immediately.

Variations:

These variations could be present in either embodiment 10 in FIG. 1 or embodiment 100 in FIG. 2.

In the preferred embodiments, the calibration data and operation does not include measurements of the storage tank level 14. However, the storage tank level 14 could also be monitored. Calibration data would then include data regarding the relationship between head pressure and a level of chemical in the chemical storage tank 14. Operation would include measuring, recording, and indicating by way of digital display or analog signal output the storage tank 14 level each testing cycle. This data when used in conjunction with previous readings can also be used for determining/indicating loss of fluid from valves/fittings/pipe between the measuring vessel and the storage tank 14. This could also be used as a check or verification of the measured/calculated flow rates over longer periods of time.

The processor 24 could also have control over the chemical injection device 16 enabling the device 10, 100 to adjust the flow rate through the chemical injection device 16 in order to meet a target flow rate or batch a preset volume of fluid over a set amount of time etc.

The preferred embodiments could also have a processor 24 which has historical calibration data regarding the relationship between head pressure and a height of the column of fluid in the measuring vessel 18, the processor 24 determining flow rate by monitoring signals from the at least one sensor 22 and performing calculations using the historical calibration data and current data regarding dynamic changes to head pressure.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A continuous flow chemical metering apparatus, comprising:
    a conduit adapted to be connected as part of a chemical injection line downstream of a chemical storage tank and upstream of a chemical injection device for controlling injection of chemical drawn from the chemical storage tank through the chemical injection line;

a measuring vessel adapted to hold a column of fluid, the measuring vessel being in fluid communication with the conduit;

an automated valve for controlling flow through the conduit, the automated valve being positioned upstream of the measuring vessel;

means for determining head pressure of the measuring vessel, including at least one sensor; and a processor capable of being calibrated to establish calibration data regarding the relationship between head pressure and a height of the column of fluid in the measuring vessel, the processor being adapted to control the automated valve and to receive data from the at least one sensor, the processor controlling a continuous testing cycle in which the automated valve is closed when the height of the column of fluid in the measuring vessel reaches a predetermined height so that chemical drawn by the chemical injection device partially empties the measuring vessel, and then the automated valve is reopened so that chemical drawn by the chemical injection device is drawn from the chemical storage tank while the height of the column of fluid in the measuring vessel again has an opportunity to rise to the predetermined height, the processor determining flow rate by monitoring signals from the at least one sensor and performing calculations using the calibration data and current data regarding dynamic changes to head pressure.

2. The continuous flow chemical metering system as defined in claim 1, wherein the predetermined height is a height at which the height of the column of fluid in the measuring vessel stabilizes in relation to a level of chemical in the chemical storage tank and calibration data includes a relationship between head pressure and the level of chemical in the chemical storage tank.

3. The continuous flow chemical metering system as defined in claim 1, wherein the processor has control over the chemical injection device.

4. The continuous flow chemical metering system as defined in claim 1, wherein a level sensor is provided on the measuring vessel.

5. The continuous flow chemical metering system as defined in claim 1, wherein a temperature sensor is provided on the conduit.

6. A continuous flow chemical metering system, comprising in combination:

a chemical storage tank;

a chemical injection line leading from the storage tank;

a measuring vessel adapted to hold a column of fluid, the measuring vessel being in fluid communication with the chemical injection line;

an automated valve for controlling flow through the chemical injection line, the automated valve being positioned upstream of the measuring vessel;

a chemical injection device for controlling injection of chemical drawn from the chemical storage tank through the chemical injection line, the chemical injection device being positioned downstream of the measuring vessel;

means for determining head pressure of the measuring vessel, including at least one sensor; and a processor having calibration data regarding the relationship between head pressure and a height of the column of fluid in the measuring vessel, the processor being adapted to control the automated valve and to receive data from the at least one sensor, the processor controlling a continuous testing cycle in which the automated valve is closed when the height of the column of fluid in the measuring vessel has stabilized so that chemical drawn by the chemical injection device partially empties the measuring vessel, and then the automated valve is reopened so that chemical drawn by the chemical injection device is drawn from the chemical storage tank while the height of the column of fluid in the measuring vessel again has an opportunity to stabilize, the processor determining flow rate by monitoring signals from the at least one sensor and performing calculations using the historical calibration data and current data regarding dynamic changes to head pressure.

7. The continuous flow chemical metering system as defined in claim 6, wherein the processor has calibration data regarding the relationship between head pressure and a level of chemical in the chemical storage tank.

8. The continuous flow chemical metering system as defined in claim 6, wherein the processor has control over the chemical injection device.

9. The continuous flow chemical metering system as defined in claim 6, wherein a level sensor is provided on the measuring vessel.

10. The continuous flow chemical metering system as defined in claim 6, wherein a temperature sensor is provided on one of the measuring vessel or the chemical injection line.

* * * * *